United States Patent Office 2,789,998

Patented Apr. 23, 1957

2,789,998

D-HOMO-17a(20)-PREGNENES

Raymond O. Clinton, North Greenbush Township, Rensselaer County, N. Y., assignor to Sterling Drug Inc., New York, N. Y., a corporation of Delaware No Drawing. Application October 18, 1954, Serial No. 463,056

8 Claims. (Cl. 260—488)

This invention relates to new compounds of the perhydrochrysene series (D-homosteroids) and to a process for their preparation. More particularly the invention relates to compounds having the formula

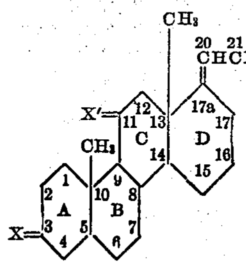

I wherein X= and X′= are selected from the class consisting of

O=, H / └OH and H / └OAcyl and R is selected from the class consisting of hydrogen and acyl groups.

My new compounds are primarily useful as intermediates for the preparation of compounds having cortical hormone-like activity. For example, the compounds of Formula I can be reacted with osmium tetroxide in the presence of acetic anhydride to give a 20,21-diacetoxy compound bearing a hydroxy group in the 17aα-position. The 20- and 21-acetoxy groups can be saponified and then selectively acetylated to give the 21-monoacetoxy derivative which can then be oxidized with chromic oxide to give the typical cortical hormone side chain. These reactions are summarized below:

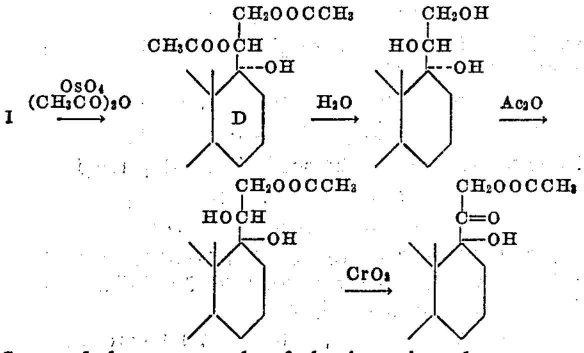

Some of the compounds of the invention also possess useful biological activity per se in that they exhibit antagonistic effects on the physiological response to cortisone.

In the above general Formula I, the groups represented by X and X′ may be the same or different in any given compound. Hydroxy or acyloxy groups in the 3- and 11-positions can be in either the α- or β-configuration.

In compounds of Formula I where OAcyl groups are present, the nature of the acyl group is not critical as it is used only as a blocking or protecting means for the hydroxy group. The preferred types of acyl groups are those derived from carboxylic acids of relatively low molecular weight, i. e., containing from one to about eight carbon atoms, including inter alia lower-alkanoic acids, lower-aliphatic dicarboxylic acids, and monocyclic aromatic carboxylic acids optionally substituted by one or more inert groups such as nitro, alkyl, alkoxy and halogen groups. Thus "Acyl" can be lower-alkanoyl, such as formyl [HCO—], acetyl [$CH_3CO$—], propionyl [$C_2H_5CO$—], butyryl [$CH_3(CH_2)_2CO$—], isobutyryl [$(CH_3)_2CHCO$—], valeryl [$CH_3(CH_2)_3CO$—], caproyl [$CH_3(CH_2)_4CO$—], octanoyl [$CH_3(CH_2)_6CO$—] and the like; carboxy-lower-alkanoyl, such as succinyl [$HOOCCH_2CH_2CO$—], glutaryl [$HOOC(CH_2)_3CO$—], adipyl [$HOOC(CH_2)_4CO$—] and the like; and monocarbocyclic aroyl, such as benzoyl [$C_6H_5CO$—], p-toluyl [p-$CH_3C_6H_4CO$—], p-nitrobenzoyl [p-$O_2NC_6H_4CO$—] and the like.

My new compounds are prepared by an allylic rearrangement under acylating conditions of a compound having the formula

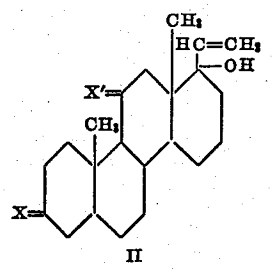

II

The compounds of Formula II are obtained as described in my copending U. S. application, Serial No. 384,325, filed October 5, 1953, and now abandoned, and in my copending application, Serial No. 475,810, filed December 16, 1954, which is a continuation-in-part of said application, Serial No. 384,325. The rearrangement is effected by heating a compound of Formula II with a strong acid in the presence of a lower-alkanoic acid anhydride. A compound of Formula I where R is the lower-alkanoyl group derived from the anhydride used is produced. If a free hydroxy group is present at the 3-position this will also be acylated during the process. A free hydroxy group at the 11-position will also be acylated if it is in the α-configuration but not if it is in the β-configuration. A preferred strong acid for the rearrangement is trichloroacetic acid, although other acids such as sulfuric, phosphoric or benzenesulfonic acid can also be employed.

An alternative procedure for carrying out the same transformation comprises reacting a compound of Formula II with phosphorus tribromide and then reacting the resulting 21-bromo compound having the side chain, =$CHCH_2Br$, with a metallic acylate, e. g. sodium acetate.

The compounds of Formula I wherein R is hydrogen are prepared by saponification of the compounds wherein R is acyl. The compounds wherein R is hydrogen can in turn be reacylated to introduce any desired acyl group by reacting them with an acid, acid anhydride or acid halide according to conventional esterification procedures.

The following examples will further illustrate the invention, but the latter is not restricted thereto.

EXAMPLE 1

*3α,21-diacetoxy-D-homo-17a(20)-pregnen-11-one*

[I; X is H / └—$OCOCH_3$, X′ is O, R is $COCH_3$]

A solution of 1.147 g. of 3α-acetoxy-17aα-vinyl-D-homoetiocholan-17aβ-ol-11-one, M. P. 219–221° C.

[II; X is H, --OCOCH$_3$, X' is O]

in 8.0 ml. of 90–95% acetic anhydride was prepared by warming on a steam bath for one hour. There was then added a solution of 1.6 g. of trichloroacetic acid in 3.0 ml. of glacial acetic acid, and the reaction mixture was heated at 66° C. for seventy-five minutes. After standing at room temperature for about fifteen hours, the reaction mixture was diluted with 300 ml. of water, extracted with ether, and the ether extracts were washed with 500 ml. of 5% sodium hydroxide solution and with water, dried over anhydrous sodium sulfate and concentrated in vacuo. The residue was dissolved in 100 ml. of 80% methanol, 20 ml. of 5% potassium carbonate solution was added and the mixture was refluxed for one hour. The reaction mixture was neutralized with dilute hydrochloric acid, concentrated to remove the methanol, the concentrate stirred with an equal volume of ice-water, and the solid product was collected by filtration and dried, giving about 1.04 g. of D-homo-17a(20)-pregnen-3α,21-diol-11-one, M. P. 232–235° C.

The total saponified product thus obtained was combined with like material obtained from another run derived from 3.89 g. of the 17aα-vinyl compound and heated with 50 ml. of 90–95% acetic anhydride and 50 ml. of pyridine on a steam bath for thirty minutes. The reaction mixture was poured into one liter of ice-water to which 15 ml. of concentrated sulfuric acid had been added. After standing for three hours, the aqueous mixture was extracted with ether, and the ether extracts were washed with water and sodium bicarbonate solution and concentrated. The residue was dissolved in 350 ml. of hot petroleum ether (Skellysolve B) which was diluted with 350 ml. of lower-boiling petroleum ether (Skellysolve A), and chromatographed on a column of 75 g. of silica gel. The column was eluted with ether-petroleum ether (Skellysolve A) mixtures of gradually increasing ether content. The material (4.231 g.) brought out by 20% ether was recrystallized twice from petroleum ether (Skellysolve B), giving 3α,21-diacetoxy-D-homo-17a(20)-pregnen-11-one, M. P. 111.5–116.5° C. (corr.), $[\alpha]_D^{25}=-53.10°$ (1% in chloroform).

*Analysis.*—Calcd. for $C_{26}H_{38}O_5$: C, 72.52; H, 8.90. Found: C, 72.40; H, 8.78.

Ozonization of 3α,21-diacetoxy-D-homo-17a(20)-pregnen-11-one gave 3α-acetoxy-D-homoetiocholane-11,17a-dione, M. P. 167–168° C., identical with an authentic sample prepared by another method, as described in my copending application, Serial No. 333,615, filed January 27, 1953. This proved that 3α,21-diacetoxy-D-homo-17a(20)-pregnen-11-one had the assigned exocyclic structure.

EXAMPLE 2

*D-homo-17a(20)-pregnene-3α,21-diol-11-one*

[I; X is H, --OH, X' is O, R is H]

The petroleum ether mother liquors from the recrystallization of 3α,21-diacetoxy-D-homo-17a(20)-pregnen-11-one in Example 1 were concentrated, and the residue was refluxed for one hour with 100 ml. of 80% methanol containing 3 g. of potassium carbonate. The reaction mixture was neutralized with dilute hydrochloric acid, concentrated to remove the methanol, the residue was diluted with water, and the solid product was collected by filtration and dried at 70° C., giving 1.8 g. of D-homo-17a(20)-pregnene-3α,21-diol-11-one, M. P. 244–246° C. After recrystallization from methanol and drying at 110° C. in vacuo for eight hours, a sample had the M. P. 237–245.5° C. (corr.), $[\alpha]_D^{25}=-24.4°$ (1% in acetic acid).

*Analysis.*—Calcd. for $C_{22}H_{34}O_3$: C, 76.25; H, 9.89. Found: C, 76.22; H, 9.70

D-homo-17a(20)-pregnene-3α,20-diol-11-one was found to have appreciable antagonistic effects on the physiological response of adrenalectomized rats to cortisone as measured by liver glycogen deposition tests.

EXAMPLE 3

*3α,21-diacetoxy-D-homo-17a(20)-pregnen-11-one*

[I; X is H, --OCOCH$_3$, X' is O, R is COCH$_3$]

A solution of 17.0 g. of trichloroacetic acid and 31 ml. of glacial acetic acid was added at 61° C. to a solution of 12.1 g. of 3α-acetoxy-17aα-vinyl-D-homoetiocholan-17aβ-ol-11-one in 87 ml. of 90–95% acetic anhydride. The reaction mixture was warmed at 60–62° C. with stirring for one and one-half hours, then kept about fifteen hours at room temperature and added to 1.5 liters of water. After two hours the mixture was extracted with ether, and the ether extracts were washed with water, 5% sodium hydroxide solution and again with water, dried over anhydrous sodium sulfate and concentrated. The residue was dissolved in 75 ml. of petroleum ether (Skellysolve B), seeded with a small quantity of the desired product, and the solid material which separated was collected by filtration, recrystallized from petroleum ether and dried at 70° C., giving 9.8 g. of 3α,21-diacetoxy-D-homo-17a(20)-pregnen-11-one, M. P. 110–112° C. (uncorr.).

EXAMPLE 4

3α,21 - diacetoxy - D - homo - 17a(20) - pregnen - 11-one was prepared from 800 mg. of 3α-acetoxy-17aβ-vinyl-D-homoetiocholan-17aα-ol-11-one, M. P. 200.5–202.5° C., a stereoisomer of the starting material used in Examples 1 and 3, 1.6 g. of trichloroacetic acid, 8 ml. of 90–95% acetic anhydride and 3 ml. of glacial acetic acid according to the manipulative procedure described above in Example 3. There was thus obtained 3α,21-diacetoxy-D-homo-17a(20)-pregnen-11-one, M. P. 109–111° C. (uncorr.).

According to the procedure described in the preceding examples, 3α,11α - diacetoxy - 17aα - vinyl - D - homoetiocholan-17aβ-ol

[II; X is H, --OCOCH$_3$, X' is H, --OCOCH$_3$]

M. P. 171–175° C. (corr.), $[\alpha]_D^{25}=-2.2°$ (1% in chloroform), can be converted to 3α,11α,21-triacetoxy-D-homo-17a(20)-pregnene

[I; X is H, --OCOCH$_3$, X' is H, --OCOCH$_3$, R is COCH$_3$]

which can be saponified to give D-homo-17a(20)-pregnene-3α,11α,21-triol

[I; X is H, --OH, X' is H, --OH, R is H]

3α-acetoxy-17a-vinyl-D-homoetiocholane-11β,17a-diol

[II; X is H, --OCOCH$_3$, X' is H, —OH]

M. P. 165.5–168° C. (corr.), $[\alpha]_D^{23}=+63.3°$ (1% in chloroform), can be converted to 3α,21-diacetoxy-D-homo-17a(20)-pregnen-11β-ol

[I; X is H, --OCOCH$_3$, X' is H, —OH, R is COCH$_3$]

which can be saponified to give D-homo-17a(20)-pregnen-3α,11β,21-triol

[I; X is H, --OH, X' is H, —OH, R is H]

and 17a-vinyl-D-homoetiocholan-17a-ol-3,11-dione [II; X is O, X' is O] can be converted to 21-acetoxy-D-homo-17a(20)-pregnene-3,11-dione [I; X is O, X' is O, R is $COCH_3$], which can be saponified to give D-homo-17a(20)-pregnen-21-ol-3,11-dione [I; X is O, X′ is O, R is H].

I claim:

1. A compound having the formula

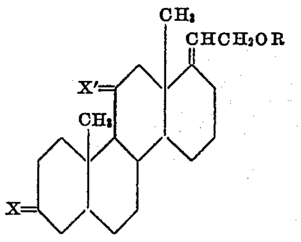

wherein X= and X′= are selected from the class consisting of

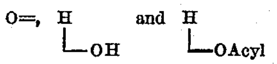

wherein acyl is a member of the group consisting of lower-alkanoyl, carboxy-lower-alkanoyl and monocarbocyclic aroyl radicals, and R is selected from the class consisting of hydrogen, lower-alkanoyl, carboxy-lower-alkanoyl and monocarbocyclic aroyl groups.

2. A 3,21-diacyloxy-D-homo-17a(20)-pregnen-11-one having the formula

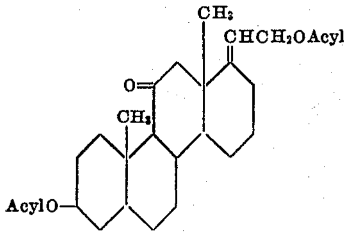

wherein acyl is a member of the group consisting of lower-alkanoyl, carboxy-lower-alkanoyl and monocarbocyclic aroyl radicals.

3. A 3,21-diacetoxy-D-homo-17a(20)-pregnen-11-one having the formula

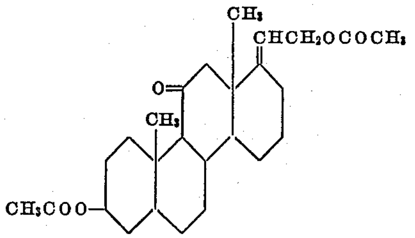

4. A D-homo-17a(20)-pregnene-3,21-diol-11-one having the formula

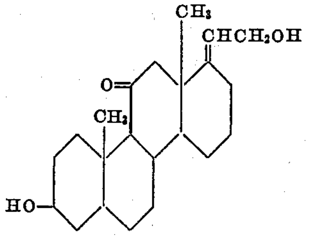

5. D-homo-17a(20)-pregnene-3$\alpha$,21-diol-11-one.

6. D-homo-17a(20)-pregnene-3$\alpha$,11$\alpha$,21-triol.

7. D-homo-17a(20)-pregnene-3$\alpha$,11$\beta$,21-triol.

8. D-homo-17a(20)-pregnene-21-ol-3,11-dione.

References Cited in the file of this patent

UNITED STATES PATENTS 2,694,080 Colton et al. ____________ Nov. 9, 1954

OTHER REFERENCES

Dimroth: Ber. Deut. Chem. 71B (1938), 1336–7.

Simonsen et al.: "The Terpenes," vol. 1, 2nd ed. (1953), pp. 63–64.